United States Patent [19]

Fujimoto et al.

[11] Patent Number: 4,930,481
[45] Date of Patent: Jun. 5, 1990

[54] ENGINE CONTROL APPARATUS

[75] Inventors: Takanori Fujimoto; Toshirou Hara, both of Himeji, Japan

[73] Assignee: Mitsubishi Denki Kabushiki Kaisha, Tokyo, Japan

[21] Appl. No.: 366,086

[22] Filed: Jun. 14, 1989

[30] Foreign Application Priority Data

Jul. 27, 1988 [JP] Japan .................. 63-188828

[51] Int. Cl.⁵ .............. F02D 41/22; F02D 17/02
[52] U.S. Cl. ......................... 123/481; 123/479; 123/198 DB
[58] Field of Search ............ 123/479, 481, 198 D, 123/198 DB, 478, 480, 198 F; 60/276, 277, 285

[56] References Cited

U.S. PATENT DOCUMENTS

| | | | |
|---|---|---|---|
| 4,006,718 | 2/1977 | Konomi | 123/479 X |
| 4,024,850 | 5/1977 | Peter et al. | 123/198 F |
| 4,117,807 | 10/1978 | Barnard | 123/478 |
| 4,366,794 | 1/1983 | Hachiga et al. | 123/479 |
| 4,378,771 | 4/1983 | Sawada et al. | 123/479 X |
| 4,469,071 | 9/1984 | Bassi et al. | 123/481 |
| 4,499,876 | 2/1985 | Yamamoto | 123/481 X |
| 4,589,401 | 5/1986 | Karim et al. | 123/479 |

Primary Examiner—Willis R. Wolfe
Attorney, Agent, or Firm—Sughrue, Mion, Zinn, Macpeak and Seas

[57] ABSTRACT

An engine control apparatus comprises a cylinder discrimination sensor for generating cylinder discrimination signal, a crank angle sensor for generating crank angle signal, a fuel injection valve provided in each cylinder of the engine, an ignition coil provided in correspondence to each and every cylinder, a flip-flop circuit for detecting a state of misfire in each cylinder on the basis of a state of signal of said ignition coil, and a micro-computer for receiving the cylinder discrimination signal, the crank angle signal and the output signal of the flip-flop circuit to detect that a state of misfiring has occured continuously at the same cylinder and for closing the fuel injection valve corresponding to the cylinder where the misfiring has occured.

4 Claims, 4 Drawing Sheets

ENGINE CONTROL APPARATUS

BACKGROUND OF THE INVENTION

1. Field of the Invention

This invention relates to an engine control apparatus and, more particularly, it is concerned with an engine control apparatus which is capable of detecting misfire in any of the engine cylinders, and preventing unburnt gas in the misfired cylinder from burning in the vicinity of the exhaust pipe to shorten the service life of a catalyst in the exhaust pipe.

2. Discussion of Background

There has been known a conventional engine control apparatus for carrying out their fuel injection control and the ignition control for each engine cylinder. In such engine control apparatus, a multi-point injection device is used for the fuel injection control, while a low-tension power distribution ignition device is used for the ignition control.

In the above-described conventional engine control apparatus, the engine operation can still be continued, even if misfire occurs in a particular engine cylinder. However, when unburnt gas is discharged from the misfired cylinder, it burned in the vicinity of the exhaust pipe to heat even a catalyst filled in it. On account of this, not only the service life of the catalyst becomes shortened, but also there is apprehension such that fire could occur.

SUMMARY OF THE INVENTION

The present invention has therefore been made with a view to solve the points of problem as mentioned above, and aims at providing an improved engine control apparatus which is simple in construction and is capable of preventing damage to the catalyst as well as occurrence of fire.

According to the present invention, there is provided an engine control apparatus which comprises a cylinder discrimination sensor for generating cylinder discrimination signal; a crank angle sensor for generating crank angle signal, a fuel injection valve provided in each cylinder of the engine; an ignition coil provided in correspondence to each and every cylinder; a misfire detection means for detecting a state of misfire in each cylinder on the basis of a state of signal of the ignition coil; and a misfiring cylinder detection means for receiving the cylinder discrimination signal, the crank angle signal and the output signal of the misfire detection means to detect that the state of misfiring has occurred continuously at the same cylinder, and for closing the fuel injection valve corresponding to the cylinder where the misfiring has occurred.

BRIEF DESCRIPTION OF THE ACCOMPANYING DRAWING

A more complete appreciation of the invention and many of the attendent advantages thereof will be readily obtained as the same becomes better understood by reference to the following detailed description when considered in connection with the accompanying drawings, wherein.

DETAILED DESCRIPTION OF PREFERRED EMBODIMENT

In the following, the present invention will be described in detail with reference to several preferred embodiments thereof as shown in the accompanying drawing.

Figure 1:
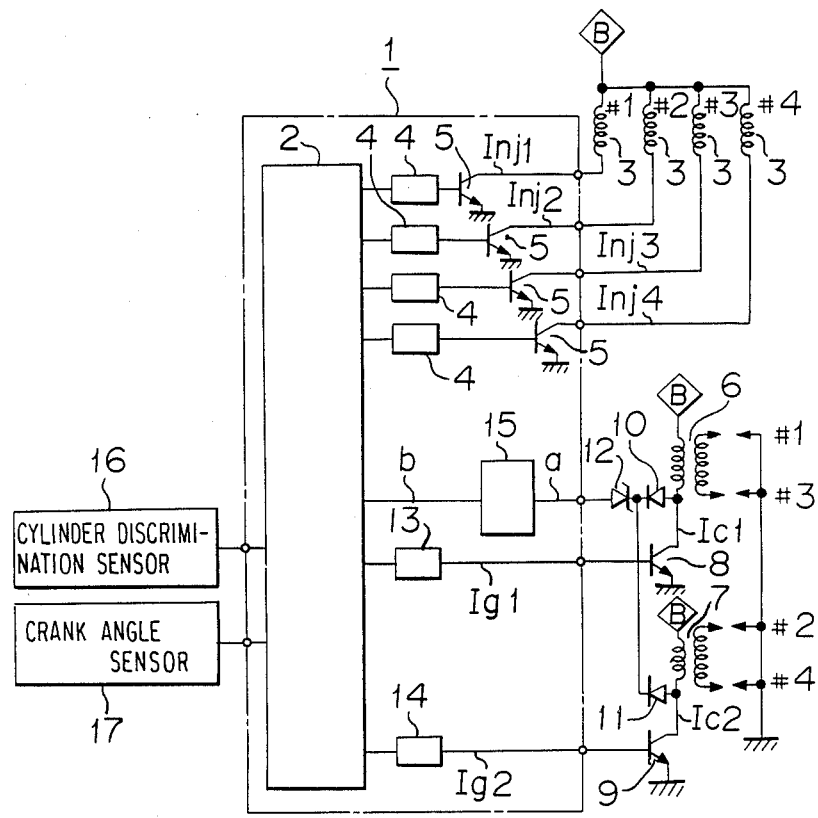
FIG. 1 is a schematic structural diagram showing an embodiment of the engine control apparatus according to the present invention.

FIG. 1 illustrates a schematic construction of the engine control apparatus according to an embodiment of the present invention, in which a reference numeral 1 designates an engine control section, a numeral 2 refers to a micro-computer, numerals 3 designate fuel injection valve driving coils provided for first-fourth cylinders (#1-#3), numerals 4 designate timers connected to the micro-computer 2, and numerals 5 designate transistors provided between each of timers 4 and the driving coils 3 and having the emitter grounded.

A reference numeral 6 designates an ignition coil for the first and third cylinders (#1, #3) with one end of the primary coil connected to a power source, a numeral 7 designates an ignition coil for the second and fourth cylinders (#2, #4) with one end of the primary coil connected to the power source, numerals 8 and 9 respectively designate transistors with the emitter grounded and the collector connected to the other end of the primary coil of each of the cylinders in order to actuate the ignition coils, numerals 10 and 11 respectively designate diodes having the anode connected to the other end of the primary coil of the ignition coils, a numeral 12 designates a Zener diode having the anode connected to the cathode of the diodes 10, 11, numerals 13 and 14 respectively designate timers which are connected to the micro-computer 2 to impart ignition control signals Ig1 and Ig2 to the transistors 8, 9 and a numeral 15 designates a misfire detection means connected between the micro-computer 2 and the Zener diode 12.

There is further introduced as an input into the input terminal of the engine control section 1 an output from a cylinder discrimination sensor 16 which generates a cylinder discrimination signal for a particular cylinder as well as an output from a crank angle sensor 17 which generates a crank angle signal in synchronism with a predetermined crank angle position.

Figure 2:
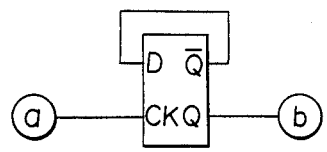
FIG. 2 shows a circuit diagram of the misfire detection means.

FIG. 2 shows a concrete construction of one example of the misfire detection means 15, in which a D-terminal and a $\bar{Q}$-terminal of a D flip-flop are mutually connected, the Q-output terminal producing alternately an H level signal and an L level signal at every rising of the clock signal.

Figure 3:
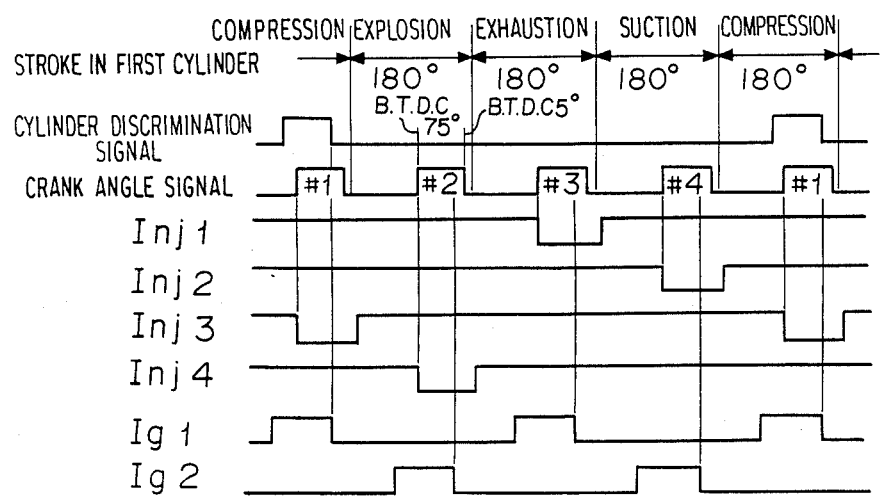
FIGS. 3 and 4 show respectively operating waveforms of important parts of the engine control apparatus according to the embodiment of the present invention.

In the following, explanations will be made as to the operation of the above-described engine control apparatus in reference to FIGS. 3 and 4 of the accompanying drawing. The cylinder discrimination signal is generated for a particular cylinder, for example, the first cylinder #1, while the crank angle signal is outputted for each of the first to fourth cylinders with a pulse width of from BTDC 75° to BTDC 5°. The micro-computer 2 operates the drive timing and the ignition timing of the fuel injection valve for each cylinder based on these signals. Then, fuel injection valve drive signals $I_{nj1}$ to $I_{nj4}$ are sequentially applied to each of the driving coils 3 through the timer 4 and the transistor 5, whereby the fuel injection is carried out. On the other hand, ignition control signals $I_{g1}$ and $I_{g2}$ are applied to the transistors 8 and 9 through the timers 13 and 14, respectively, to alternately generate the primary voltages $I_{c1}$ and $I_{c2}$ at the primary side of the ignition coils 6 and 7, whereby a high tension voltage is generated at the secondary side thereof to ignite sequentially those cylinders which are in the compression stroke. The primary voltages $I_{c1}$ and $I_{c2}$ are applied to the Zener diode 12 through the diodes 10, 11. When the applied signal level exceeds the Zener level, the voltage of the signal is applied to the misfire detection means 5 (signal a) and its output b is applied to the microcomputer 2.

In the case of the ignition of the cylinders being carried out regularly, the output signal b from the misfire detection means 15 repeats its high level signal H and low level signal L at every ignition timing. Here, when wire breakage or other troubles take place in the ignition coil 6 for the first and third cylinders (#1, #3), the primary voltage $I_{c1}$ is no longer generated as shown by a dot line in FIG. 4, whereby no ignition is effected. In such case, there is no input signal a into the misfire detection means 15, and the output b does not reverse alternately at a predetermined period, whereby the micro-computer 2 detects the misfire in the first and third cylinders.

Figure 5:
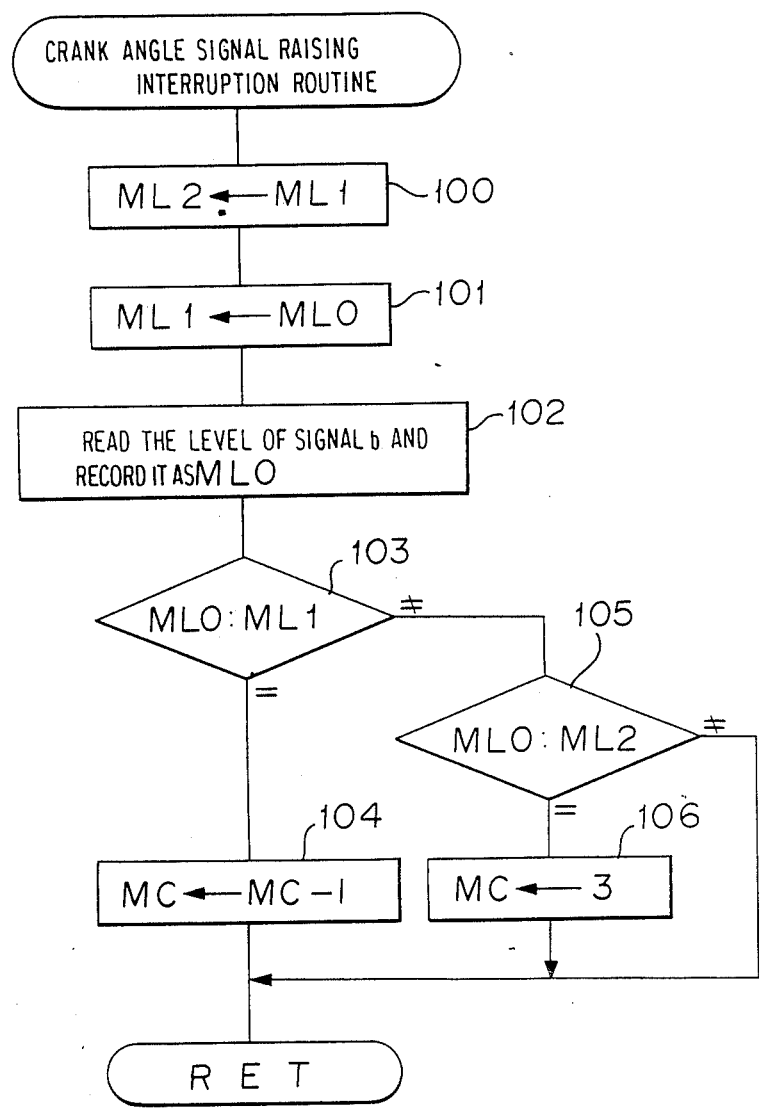
FIG. 5 is a flow chart showing the operation of a misfiring cylinder detection means in the embodiment of the engine control apparatus according to the present invention.

FIG. 5 is a flow chart showing the operation of the misfiring cylinder detection means in a micro-computer 2 which counts the number of misfire with respect to the same cylinder. A treatment of detection is carried out at every rising (BTDC 75° C.) of the crank angle signal. Characters ML2, ML1 and ML0 respectively represent the levels of the output signal b of the misfire detection means, which are stored at predetermined positions in a RAM, and ML2 represents the level of the signal b at the time before last, ML1 represents the level of signal b at the last time and ML0 represents the level of signal b at the present time.

At Step 100, ML1 recorded as the level of signal b at the last time is rewritten by ML2 as the level of signal b of the time before last. At Step 101, ML0 recorded as the level of signal b at the present time is rewritten by ML1 as the level of signal b at the last time. At Step 102, the signal b is read from the misfire detection means 15, and the level of the read signal is renewed to be ML0 as the level of signal b at the present time.

At Step 103, ML0 recorded as the level of signal b at the present time is compared with ML1 recorded as the level of signal b at the present time. If the both levels compared are the same, misfire occurs. Then, a value "1" is substracted from a value MC stored in a misfire detection counter to renew the value MC in the misfire detection counter at Step 101. Thus, a series of treatment is finished.

On the other hand, when ML0≠ML1, i.e. they are not identical, the level ML0 of signal b at the present time is compared with the level ML2 of signal b at the time before last at Step 105. When ML0=ML2, it represents that ignition is normally performed. Then, an initial value (e.g. a value "3") is set for the value MC in the misfire detection counter at Step 106. Then, a series of treatment is finished. The reason why the value "3" is used is to detect the fact that misfire continuously takes place three times in the embodiment. At Step 105, on the other hand, when ML0≠ML2, i.e. the level ML0 and the level ML2 are not the same, the value MC in the misfire detection counter is remained as it is because it is unclear whether misfire takes place or not. Then, a series of treatment is finished.

In the following, the operation of the fuel control apparatus from the detection of misfiring to the closure of a fuel injection valve to the misfired cylinder when misfire takes place, will be described with reference to FIGS. 4 and 5.

Figure 4:
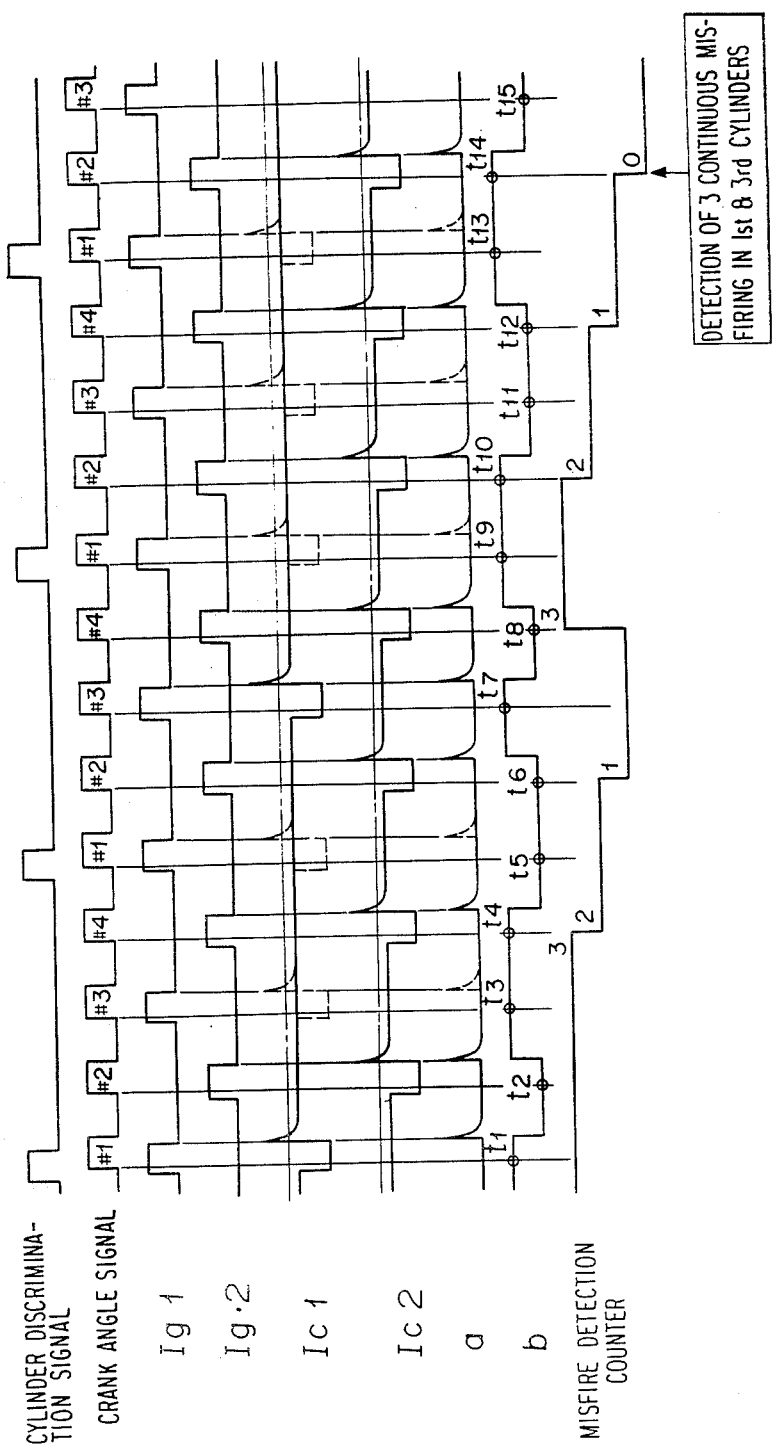

In FIG. 4, symbols $t_1-t_{15}$ designate respectively timing points at which the treatment as shown in the flow chart of FIG. 5 is carried out at every rising of the crank angle signal. During a time from $t_1$ to $t_3$, the value of the misfire detection counter is kept to be the initial value, i.e. "3" since a normal operating condition without misfiring is detected. At the time point $t_4$, the level of signal b is not reversed because misfire in the third cylinder is detected. Accordingly, the treatment of Step 104 as in FIG. 5 is done, namely, the value MC in the misfire detection counter becomes "2" by subtracting "1" from "3". At the next time point $t_5$, the level of signal b is reversed because there is no misfire in the fourth cylinder. Accordingly, the treatment of Step 105 as in FIG. 5 is done. However, there takes place no change in the value MC in the misfire detection counter because the level of signal b at the time before last at the time point $t_3$ is different from the level of signal b at the present time at the time point $t_5$. In the same manner as described above, the value MC in the misfire detection counter is reduced by "1" in accordance with the treatment as in FIG. 5 till the time point $t_7$. At the time point $t_8$, ignition at the third cylinder which was in a misfiring state is restored to normal condition. Accordingly, the treatment of Step 106 as in FIG. 5 is done, so that the value MC in the misfire detection counter is set to be the initial value of "3". Then, misfiring condition in the first and third cylinders is detected, whereby the value MC in the misfire detection counter is reduced one by one at each of the time points $t_{10}$, $t_{12}$ and $t_{14}$, and finally the value MC in the misfire detection counter becomes "0". When the value MC in the misfire detection counter is changed to "0" and the cylinder discrimination signal and the crank angle signal are received, the micro-computer 2 detects that misfire takes place continuously in the first and third cylinders, and prohibits the outputs of the fuel injection valve driving signals $I_{nj1}$, $I_{nj3}$ corresponding to the misfired first and third cylinders to thereby stop fuel injection to the cylinders. Accordingly, discharge of unburnt gas can be prevented.

In the above-mentioned embodiment, the fuel injection valve corresponding to the misfired cylinder is closed when the misfire at a predetermined number of misfire, e.g. three times is continuously detected. However, the fuel injection valve may be closed when a predetermined time is lapsed.

Thus, in accordance with the fuel control apparatus of the present invention, when misfire takes place continuously in the same cylinder of the engine, fuel injection to the misfired cylinder is stopped by detecting the continuous misfiring of the same cylinder. Accordingly, it is possible to detect misfire without a risk of erroneous detection of the misfire, whereby undesired burning of unburnt gas in the exhaust pipe can be prevented. Further, the service life of the catalyst can be prolonged and undesired occurrence of misfire can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. An engine control apparatus which comprises a cylinder discrimination sensor for generating cylinder discrimination signal; a crank angle sensor for generating crank angle signal, a fuel injection valve provided in each cylinder of the engine; an ignition coil provided in correspondence to each and every cylinder; a misfire detection means for detecting a state of misfire in each cylinder on the basis of a state of signal of said ignition coil; and a misfiring cylinder detection means for receiving the cylinder discrimination signal, the crank angle signal and the output signal of said misfire detection means to detect that the state of misfiring has occurred continuously at the same cylinder, and means for closing the fuel injection valve corresponding to the cylinder where the misfiring has occurred.

2. The engine control apparatus according to claim 1, wherein said misfire detection means produces a signal which changes regularly between a high level and a low level for each signal applied to the ignition coils when the ignition coils normally operate.

3. The engine control apparatus according to claim 2, wherein said misfiring cylinder detection means is to detect that the signal from the misfire detection means with respect to a certain ignition coil does not regularly change continuously a predetermined number of misfire, whereby an output to the fuel injection valve corresponding to the ignition coil is stopped.

4. The engine control apparatus according to claim 3, wherein said predetermined number of misfire is three.

* * * * *